UNITED STATES PATENT OFFICE.

HENRY NOEL POTTER, OF NEW YORK, N. Y., ASSIGNOR TO GEORGE WESTINGHOUSE, OF PITTSBURGH, PENNSYLVANIA; HENRY HERMAN WESTINGHOUSE, CHARLES A. TERRY, AND WALTER D. UPDEGRAFF, EXECUTORS OF SAID GEORGE WESTINGHOUSE, DECEASED.

PROCESS OF PRODUCING SILICON MONOXID.

1,104,384.     Specification of Letters Patent.     Patented July 21, 1914.

No Drawing. Original application filed December 30, 1904, Serial No. 238,925. Divided and this application filed July 29, 1907. Serial No. 386,153.

*To all whom it may concern:*

Be it known that I, HENRY NOEL POTTER, a citizen of the United States, and resident of New York, county of New York, State of New York, have invented certain new and useful Improvements in Processes of Producing Silicon Monoxid, of which the following is a specification.

I have discovered a new compound of silicon and oxygen of great theoretical and practical importance, namely;—silicon monoxid—expressed by the formula SiO. The theoretical importance of this material lies in the fact that it supplies a hitherto missing analogy between the elements carbon and silicon, and is, therefore, another argument in support of the periodic arrangement of the elements according to Mendelejeff.

I found in attempting to fuse the dioxid of silicon about a graphite rod heated by the passage of electric current that, when this operation was performed in a chamber from which the air had been partially exhausted and when the temperature was sufficiently high, the exposed portions of the interior of the chamber were covered with a brown powder of extreme fineness which I now know to be crude silicon monoxid. I subsequently found that the yield could be increased by surrounding the rod with a mixture of silicon dioxid and carbon in the proportions required for the partial reduction of the silicon dioxid, namely; twelve (12) parts of carbon to sixty and four tenths (60.4) parts of silicon dioxid. The core itself being capable of supplying some carbon it is found to be advantageous to use an excess of silicon dioxid and in practice I have been accustomed to use twelve (12) parts of carbon to sixty five (65) parts of silicon dioxid. I further found that it is not necessary to operate under reduced pressure but that the silicon monoxid is also produced under full atmospheric pressure in any atmosphere which is incapable of destroying it. I also found that the same result can be produced starting with mixtures of silicon dioxid and silicon carbid, or silicon dioxid and the complex substance known as carborundum fire sand, which is at present supposed to be a mixture of silicon carbid, silica, carbon, and oxy-carbids or silicon of unknown composition, having the general formula of $Si_xC_xO_y$. The relative proportions when using silicon carbid or fire sand must be determined by analysis and are such that the proportion of combined and free carbon present is only sufficient to partially reduce the silicon dioxid. In case the quantity of carbon present is in slight excess, reduction will in general result in the production of metallic silicon in addition to silicon monoxid.

It appears that the two oxygen atoms in the silicon dioxid molecule are not attached to the metallic element with equal strength and analogously to carbon dioxid it is apparently possible to remove the first atom of oxygen at a lower temperature, with the production of the monoxid, than it is to remove the second oxygen atom from the monoxid to produce the element. There is, therefore, an inherent tendency to the production of the monoxid and thereby the maintenance of the charge at a temperature too low for the removal of the second oxygen atom, the reduction of the monoxid occurring presumably at higher temperature. Whenever, therefore, by any device, the monoxid is removed from the field of reaction as fast as formed, the tendency is to continue the production of monoxid rather than a product of complete reduction. The monoxid of silicon produced in this way is an amorphous powder of remarkable fineness, no individual particles being perceptible by the usual tests. The extreme fineness is also shown by the fact that a large portion of the powder remains suspended for weeks in water. The material produced in the above described manner usually contains a small but varying quantity of impurities consisting of carbon, silicon dioxid, silicon carbid and traces of iron and aluminum compounds derived from impurities in the raw material. A specially pure sample made with a careful selection of the silica and carbon used for reduction and the use of a very pure Acheson graphite heating conductor operating in a partial vacuum, the remanent atmosphere in the furnace consisting of hydrogen, gave a material of the following composition:

| | |
|---|---|
| SiO | 91.28% |
| $SiO_2$ | 3.42% |
| SiC | 1.03% |
| C | 2.54% |
| An iron compound assumed to be $FeSi_2$ | .80% |
| $Al_2O_3$ | .93% |
| | 100.00% |

Silicon monoxid is distinguished from silicon dioxid chemically by its being markedly less soluble in hydrofluoric acid and markedly more soluble in dilute caustic alkalis. It is also distinguished from silicon dioxid by the fact that it will burn if heated in oxygen and that it is more permeable to Röntgen rays. If in an extremely fine state of division it will also burn in air, the combustion gradually creeping through the mass.

The material is distinguished from the elemental silicon by its lower specific gravity and by increasing about 36% in weight when converted into silicon dioxid, whereas metallic silicon increases approximately 113%. It is therefore clear that this material can be readily distinguished from other materials. It is possible to quantitively determine the increase of weight of a given sample when oxidized from SiO to $SiO_2$ either by direct oxidation or by solution in caustic alkalis and reprecipitating with hydrochloric acid observing the usual precautions. Repeated analyses show that the increase in weight is well within 1% of that required by theoretical considerations. Beside the theoretical importance of this discovery the material itself is of great practical importance as it is an abrasive of such hardness and fineness as to render it extremely valuable as a metal polish. The bulk of this powder is also extremely great relative to its weight, the apparent density being approximately .04 so that a cubic foot of it weighs about two and one half (2½) pounds. Its true specific gravity is about 2.24 and it is therefore obvious that a very large amount of air is inclosed between the particles of powder. The powder is for this reason an extremely good non-conductor of heat, the best in fact of any mineral substance known to the applicant. Owing to its pleasing color and its extreme fineness in paints either alone is a valuable pigment in paints either alone or in combination with other pigments. The material can also be pressed into bricks and can be baked into firmly cohering masses either by itself or in combination with alumina, magnesia, or other substances, to form abrasive wheels or stones, or for other useful purposes. I have also discovered a vitreous form of the same material which has the same specific gravity and chemical characteristics and a hardness sufficient to scratch glass. In the vitreous form it is easy to show that the material is a non-conductor of electricity a distinction from crystalline metallic silicon. The vitreous form sometimes occurs adhering to the charge in carrying out the process described above and the broader claims in this application are intended to cover the method of producing both forms of this substance.

This application is a division of application Serial Number 238,925, filed December 30, 1904. A division of the present application relating to the use of silicon monoxid in powdered form as a heat insulating substance was filed June 10, 1912, under the Serial Number 702,699.

I claim as my invention:—

1. The method of making silicon monoxid which consists in so heating a surface consisting of a mixture of silica and carbon by an electrical source of heat in a partly filled inclosing chamber free from chemically active gases, that gaseous carbon monoxid and silicon monoxid upon liberation may expand quickly out of the reaction region and the active contact between sicilon monoxid and carbon be thereby practically arrested.

2. The process of making a pulverulent material containing silicon monoxid, which consists in heating silicon dioxid in contact with carbon to a critical temperature in a partially filled inclosing chamber.

3. The process of making a pulverulent material containing silicon monoxid, which consists in heating silicon dioxid in contact with carbon to a critical temperature in a partially filled inclosing chamber, into the unfilled portion of which the reaction product can escape from the region of the reaction.

4. The process of making a pulverulent compound containing monoxid of silicon, which consists in heating to a critical temperature a mixture of silicon dioxid and carbon in approximately the proportion of twelve (12) parts carbon to sixty and four tenths (60.4) parts of silicon dioxid.

Signed at New York, in the county of New York, and State of New York, this 26th day of July A. D. 1907.

HENRY NOEL POTTER.

Witnesses:
WM. H. CAPEL,
THOS. H. BROWN.